United States Patent [19]

Prakken

[11] Patent Number: 5,022,218

[45] Date of Patent: Jun. 11, 1991

[54] DEVICE FOR FILLING OUTERS WITH FILLED BAGS

[76] Inventor: Bouwe Prakken, Spijkerlaan 9, 3471 EG Kamerik, Netherlands

[21] Appl. No.: 501,127

[22] Filed: Mar. 29, 1990

[30] Foreign Application Priority Data

Mar. 29, 1989 [NL] Netherlands ............ 8900771

[51] Int. Cl.$^5$ ............................................. B65B 63/02
[52] U.S. Cl. ........................................ 53/529; 53/245; 53/535; 53/540
[58] Field of Search ................. 53/244, 245, 252, 255, 53/258, 259, 529, 535, 536, 537, 538, 540; 414/790.3, 793.4, 793.5, 794, 794.2, 794.3; 198/418.6, 835

[56] References Cited

U.S. PATENT DOCUMENTS

| | | | |
|---|---|---|---|
| 3,499,261 | 3/1970 | Hullhorst et al. ............ | 53/438 X |
| 3,596,778 | 8/1971 | Lamonica et al. . | |
| 3,624,782 | 11/1971 | McPeek ....................... | 414/793.4 |
| 3,657,860 | 4/1972 | Franklin ....................... | 53/535 |
| 3,824,759 | 7/1974 | Finn et al. .................... | 53/540 X |
| 3,848,725 | 11/1974 | Toby ............................ | 414/794 X |
| 3,972,409 | 8/1976 | Hayashi ........................ | 198/418.6 |
| 4,026,421 | 5/1977 | Lotz . | |
| 4,633,655 | 1/1987 | Nigrelli, Sr. ................. | 53/252 X |
| 4,688,369 | 8/1987 | Cornish et al. .............. | 53/438 X |
| 4,708,564 | 11/1987 | Mylrea et al. ............... | 414/794.3 X |
| 4,899,518 | 2/1990 | Beeman et al. .............. | 53/258 X |

FOREIGN PATENT DOCUMENTS 0303307 2/1989 European Pat. Off. .
1160358 12/1963 Fed. Rep. of Germany .

Primary Examiner—Robert L. Spruill
Assistant Examiner—Daniel B. Moon
Attorney, Agent, or Firm—Young & Thompson

[57] ABSTRACT

A device for filling outers with filled bags comprises a cassette (1) for the accommodation of a number of bags or rows of bags stacked on each other, feed apparatus (10, 11) for filling the cassette with bags from the top, and discharge apparatus (4, 5) for sliding the stack laterally out of the cassette into a tilted outer. For the purpose of simplification and for making the structure less susceptible to faults, the cassette has a fixed position, and a sliding cover plate or deposit plate (8) is placed at the top side of the cassette for supporting a row of bags. Structure (9) is present for sliding the cover plate (8) to and fro between a covering position in which the top side of the cassette is covered and a free position in which the bags can fall into the cassette. At the top edge of a side wall of the cassette provision is made for a retaining element (16), and through displacement of the plate (8) to the free position the supported row of bags is retained by the retaining element (16) and falls into the cassette. Displacement structure (3) is also added to the bottom plate (2), in order to shift the plate in stages from a position in the top of the cassette to a bottom position, and in order to make it possible for the bottom plate to be pressed upwards to compress the stack of bags between the bottom plate (2) and the cover plate (8).

6 Claims, 3 Drawing Sheets

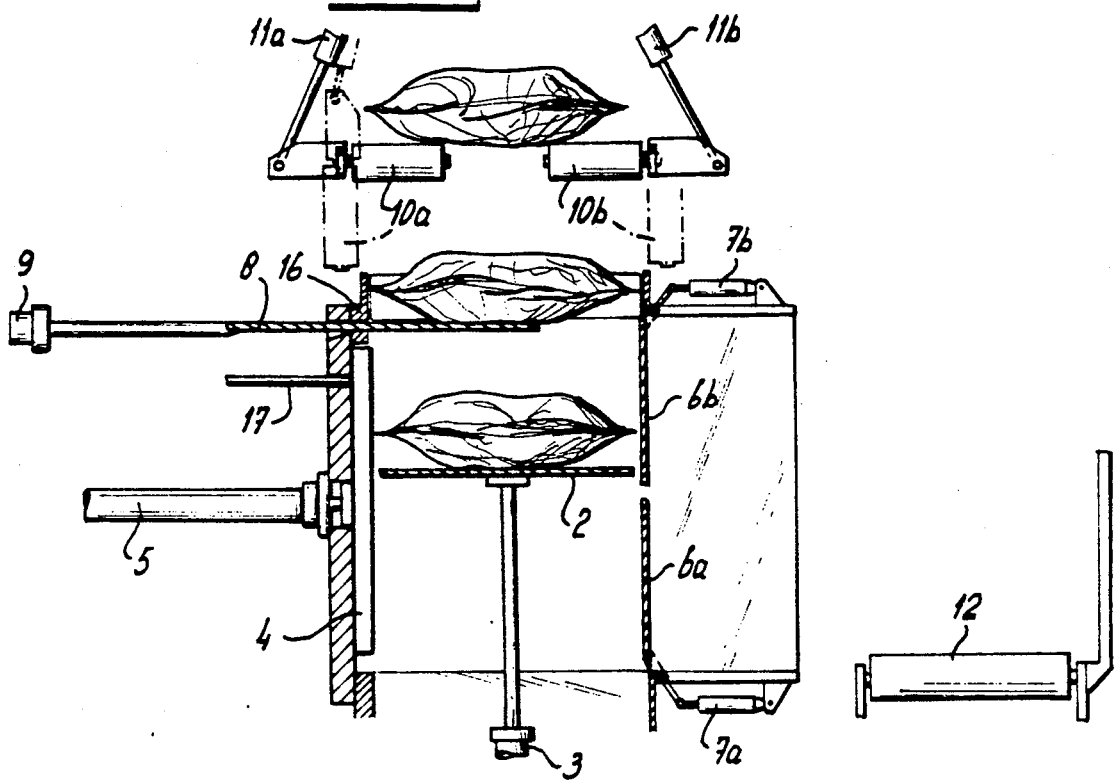
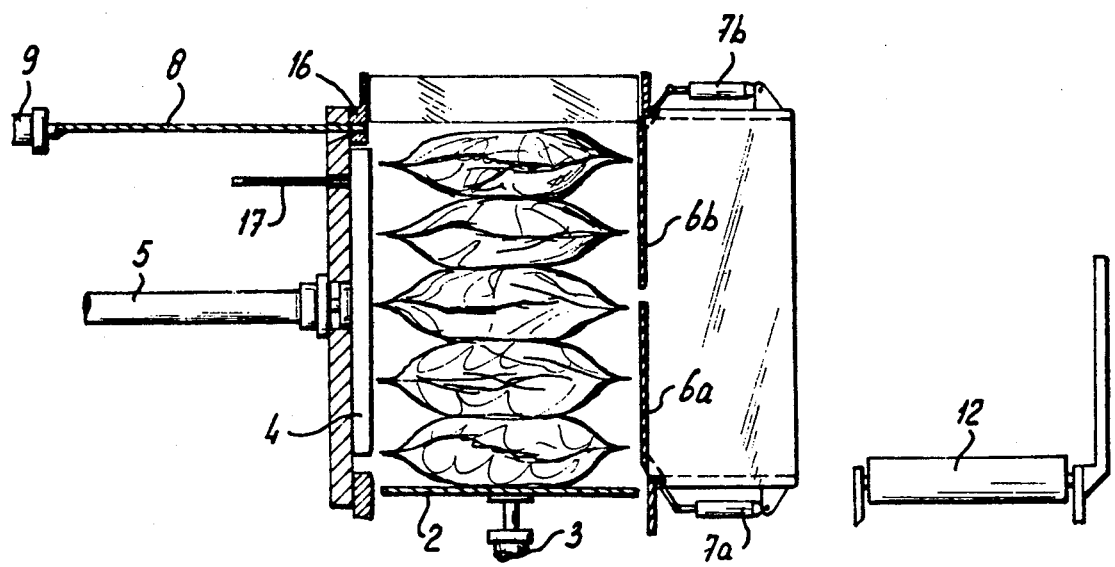

DEVICE FOR FILLING OUTERS WITH FILLED BAGS

The invention relates to a device for filling outers with filled bags, comprising a cassette for the accomodation of a number of bags or rows of bags stacked on each other, feed means for filling the cassette with bags from the top, and discharge means for sliding the stack out of the cassette into a tilted outer.

Such a device is known from EU-A-303,307.

The cassette of this known device can be moved to and fro between a receiving position, in which rows of bags can be stacked on each other in the cassette, and a discharge position, in which the discharge means can slide the stack into a tilted outer. In the receiving position a supporting plate moves downwards in stages. The rows of bags are stacked on this intermittently lowering supporting plate. In the bottom position of the supporting plate, said plate moves laterally out of the cassette through a slit in the side wall. The movement mechanism of the supporting plate is complex and susceptible to breakdowns.

The object of the invention is to produce a device of the type mentioned in the preamble which does not have the above-mentioned disadvantages, i.e. which is simpler in design and exhibits fewer faults.

According to the invention, the device is to this end characterized in that the cassette has a fixed position, in that a sliding cover plate for supporting a row of bags is placed at the top side of the cassette, and means are present for sliding the cover plate to and fro between a covering position in which the top side of the cassette is covered and a free position in which the bags can fall into the cassette, and in that a retaining element is fitted at the top edge of a side wall of the cassette, and through displacement of the cover plate to the above-mentioned free position the supported row of bags is retained by the retaining element and falls into the cassette, and in that displacement means are added to the bottom plate in order to shift said plate in stages from a position in the top of the cassette to a bottom position, and in order to make it possible for the bottom plate to be pressed upwards to compress the stack of bags between the said bottom plate and the said cover plate.

The cassette has a fixed position and the bags can fall from the feed means directly into the cassette. A more accurate stacking result is achieved through the cover plate also being the deposit plate for supporting a row of bags. Through shifting the plate to the above-mentioned free position, the supported row of bags is retained by the retaining element and falls into the outer.

Since the cassette does not move to and fro, there is no complex mechanism for moving the intermittently moving bottom plate laterally out of the cassette.

In order to slide the stack collected in the cassette into a tilted outer, one side wall of the cassette is a push plate connected to a push element, while the side wall opposite said push plate is made up of outward-hinging doors.

The doors are preferably hinged by means of hydraulic, pneumatic or mechanical devices. In order to ensure that the stack of bags present in the cassette does not fall over when the doors open, the push plate can be perforated and form part of a cabinet connected to a vacuum source. The push plate holds the stack by suction. Of course, the vacuum in the cabinet is released by means of a controlled valve once the stack of bags is pushed into the outer.

The feed means preferably comprise one or two conveyor belts which can be swung away about a longitudinal edge.

The invention will now be explained in greater detail with reference to the figures, in which an example of an embodiment is shown.

FIG. 2 shows a cross-section through the device during the collection in the cassette of stacks of bags arranged in a row.

FIG. 3 shows the same flat cross-section after the cassette is filled.

Figure 1:
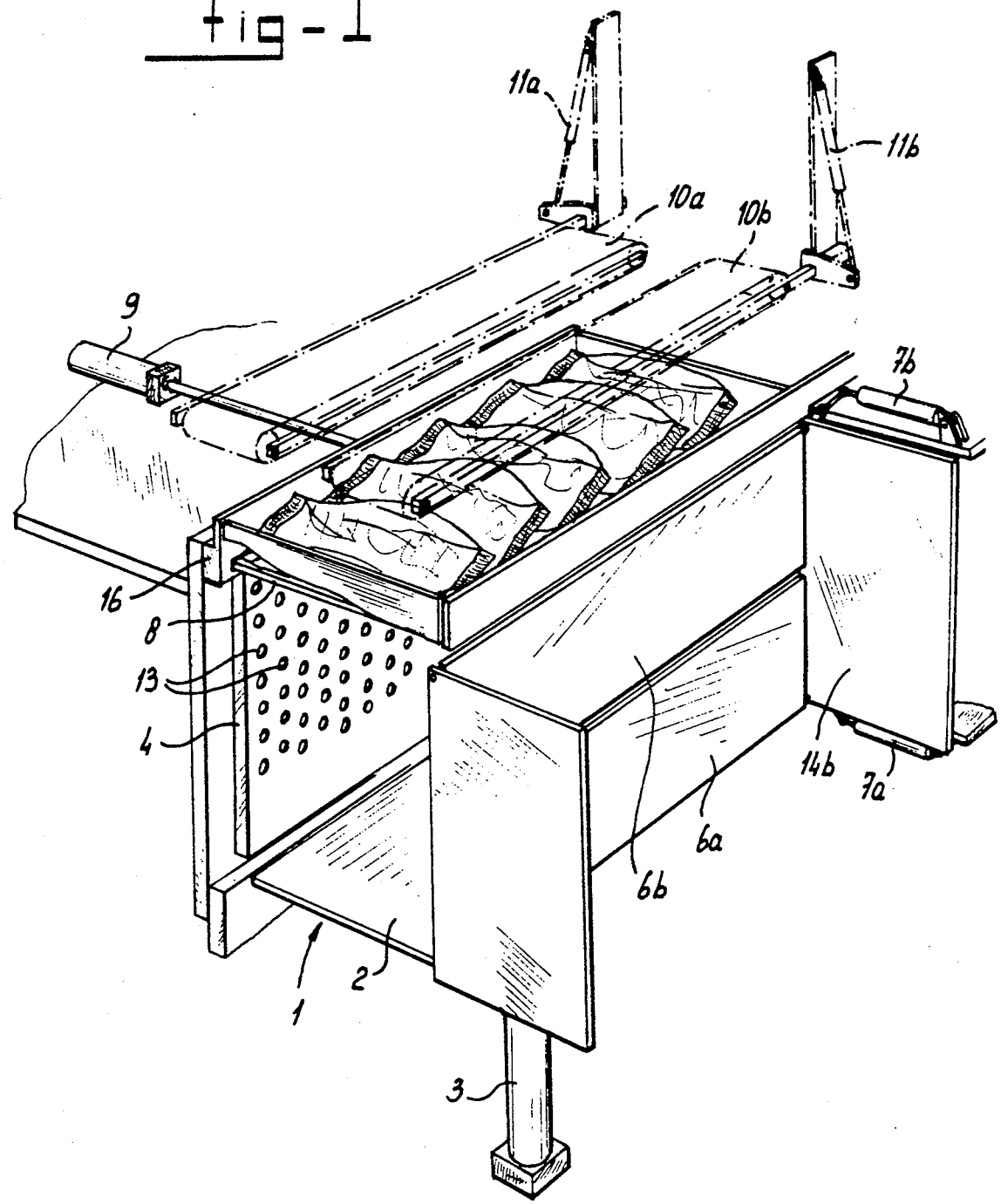
FIG. 1 shows a perspective view of the device.

The device shown comprises a cassette 1 for the accommodation of a number of rows of filled bags (e.g. with crisps) stacked on each other. The cassette comprises a bottom plate 2 which can be moved up and down by means of a pneumatic or hydraulic cylinder 3, a push element 4 which can be moved to and fro by means of a pneumatic or a hydraulic cylinder 5, and two doors 6a, 6b which can be swung open and shut by means of pneumatic or hydraulic cylinders 7a, 7b.

Figure 4:
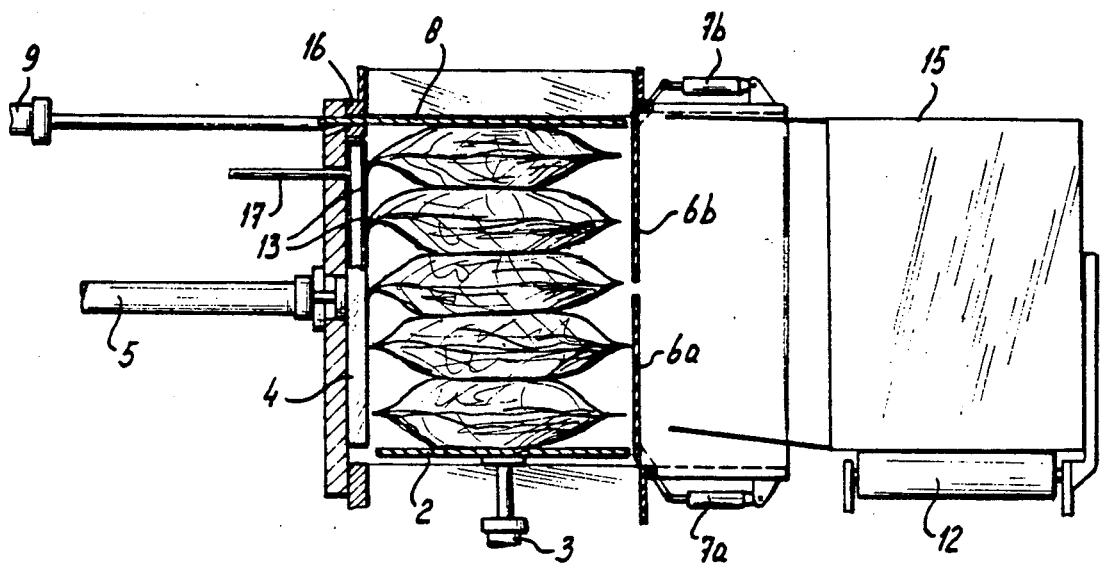
FIG. 4 shows the same cross-section (leaving out the supply and feed means) just before the stack is pushed into an outer.
Figure 5:
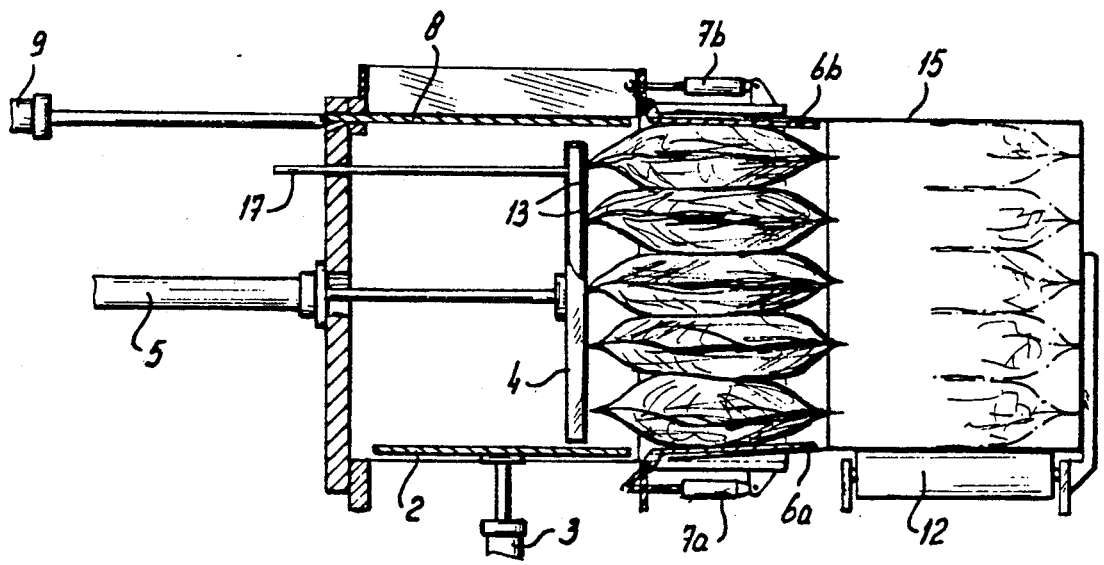
FIG. 5 shows the same cross-section (leaving out the feed means) while the stack is being pushed into an outer.

Placed on or above the cassette 1 is a cover plate 8, which can be moved to and fro by means of pneumatic or hydraulic cylinders 9 between a position (FIG. 3) in which the top side of the cassette is free and a position (FIGS. 4, 5) in which the top side of the cassette is covered. Above the cover plate is a device for feeding in bags and collecting them in a row. This feed device comprises two adjacent tiltable conveyor belts 10a, 10b which can be tilted by means of pneumatic or hydraulic cylinder 11a, 11b about a longitudinal edge between a horizontal and a vertical position.

A supply conveyor 12 for outers 15 is set up next to the cassette 1.

The push element 4 is designed in the form of a cabinet whose inward-facing wall is provided with perforations 13 (FIG. 1). The cabinet is connected to a vacuum source by means of a line 17. The connection between the cabinet and the vacuum source can be interrupted by means of a valve (not shown).

Fixed frame plates 14a, 14b (FIG. 1) are placed at right angles to the doors 6a, 6b.

The device works as follows:

A row (e.g. made up of five bags) is formed on the conveyor belts 10a, 10b. The cover plate 8 is in the covering position. Tilting the belts by means of the cylinders 11a, 11b about a longitudinal edge into the vertical position takes the row of bags onto the cover plate 8. The bottom plate 2 is taken by the cylinder 3 into the top position. By pulling back of the plate 8, the row of bags, which are prevented by the retaining element 16 from moving with said plate 8, will pass onto the bottom plate 2. This plate 2 will then be moved down the thickness of a bag. The belts have in the meantime tilted back into the horizontal position, so that a new row of bags can be collected.

This cycle is repeated until the cassette is full. A number of rows (in the case shown, five) are then in the cassette, and the bottom plate 2 has gone into the bottom position.

The cover plate 8 is then taken into the covering position (FIG. 4), and the bottom plate 2 is conveyed upwards some distance (e.g. approx. 5 to 10 cm), causing the stack to be compressed between the plates 2 and 8.

In the meantime, the outer supply conveyor 12 conveys an outer 15 in the tilted position up to the doors 6a, 6b. The cabinet 4 is connected by means of the line 17 to the vacuum source (e.g. a suction pump), causing the stack to be held to the cabinet by suction.

After opening of the doors 6a, 6b the stack of bags is pushed by the push element 4 into the outer 15. The lid flaps of the outer are outside the doors 6a, 6b at that point, and are possibly outside the frame plates 14a, 14b.

After releasing of the vacuum and pulling back of the cabinet 4, the filled outer is discharged and closed.

Several variations are conceivable within the scope of the invention. The characteristic feature of the invention is that for filling of the outer use is made of a cassette with a fixed position, in which the top side of said cassette can be covered and the bottom of the cassette can be moved upwards slightly to compress a stack of bags placed in the cassette.

What is claimed is:

1. Apparatus for filling outers with filled bags comprising:
    a cassette (1) having a bottom plate (2), a first side wall (4) and a second side wall comprising at least one door (6a, 6b),
    a cover plate (8) at the top side of the cassette for supporting a row of bags,
    means (9) for moving said cover plate laterally between a position covering the top side of the cassette and a free position,
    a retaining element (16) next to said cover plate for retaining a row of bags above the cassette (1) when the cover plate moves to said free position,
    means (3) for moving said bottom plate up and down in order to shift said bottom plate (2) in stages from a position at the top of the cassette to a bottom position and in order to make it possible for the bottom plate to be pressed upward to compress the stack of bags between the said bottom plate and the said cover plate,
    means (5) for pushing one (4) of said first and second side walls of the cassette in the direction of the other (6a, 6b) of said first and second side walls,
    means (7a, 7b) for moving said doors (6a, 6b) between a closed position and an open position,
    and means (12) for moving tilted outers to a position facing said other side wall (6a, 6b).

2. Apparatus as claimed in claim 1, wherein said first side wall (4) is pushed toward said second side wall (6a, 6b) by said pushing means.

3. Apparatus as claimed in claim 2, wherein said at least one door (6a, 6b) comprises a pair of doors that swing away from each other and away from said first side wall (4) when said first side wall (4) pushes said row of bags into a tilted outer.

4. Apparatus as claimed in claim 1, further comprising means for feeding filled bags onto said cover plate when said cover plate covers the top side of the cassette, said feed means comprising at least one conveyor belt mounted for vertical movement between a horizontal position and a downward position, said conveyor belt moving said bags above said cover plate in said horizontal position and delivering said bags onto said cover plate in said downward position of the conveyor belt.

5. Apparatus as claimed in claim 4, there being two said conveyor belts on which said bags are jointly supported, said belts swinging upwardly toward each other and downwardly away from each other.

6. Apparatus as claimed in claim 1, said first wall (4) having perforations (13) therethrough, said first wall (4) forming part of a cabinet connected to a vacuum source.

* * * * *